United States Patent [19]

Langer, Jr.

[11] 4,134,938

[45] Jan. 16, 1979

[54] PROCESS FOR POLYMER LITHIATION IN GRAFT POLYMERIZATION

[75] Inventor: Arthur W. Langer, Jr., Watchung, N.J.

[73] Assignee: Exxon Research & Engineering Co., Florham Park, N.J.

[21] Appl. No.: 819,847

[22] Filed: Jul. 28, 1977

Related U.S. Application Data

[60] Continuation of Ser. No. 713,659, Aug. 12, 1976, which is a division of Ser. No. 562,826, Mar. 28, 1975, which is a continuation of Ser. No. 309,359, Nov. 24, 1972, abandoned, which is a continuation-in-part of Ser. No. 81,181, Oct. 15, 1970, Pat. No. 3,751,384, which is a continuation-in-part of Ser. No. 825,384, May 16, 1969, Pat. No. 3,536,679, which is a continuation-in-part of Ser. No. 589,240, Oct. 25, 1966, Pat. No. 3,451,988, which is a continuation-in-part of Ser. No. 266,188, Mar. 19, 1963, abandoned. Said Ser. No. 562,826 is a continuation-in-part of Ser. No. 690,054, Dec. 13, 1967, which is a continuation-in-part of Ser. No. 560,110, Jun. 24, 1966, abandoned, which is a continuation-in-part of Ser. No. 505,976, Nov. 1, 1965, abandoned, which is a continuation-in-part of Ser. No. 359,434, Apr. 3, 1964, Pat. No. 3,458,856, which is a continuation-in-part of said Ser. No. 266,188. Said Ser. No. 562,826 is a continuation-in-part of Ser. No. 886,008, and Ser. No. 886,009, both Dec. 17, 1969, each is a division of said Ser. No. 690,054. Said Ser. No. 562,826 is a continuation-in-part of said Ser. No. 690,076, Dec. 13, 1967, which is a continuation-in-part of said Ser. No. 560,110. Said Ser. No. 562,826 is a continuation-in-part of Ser. No. 61,813, Aug. 6, 1970, which is a continuation-in-part of said Ser. No. 825,384. Said Ser. No. 562,826 is a continuation-in-part of Ser. No. 60,772, Aug. 3, 1970.

[51] Int. Cl.$^2$ .................. C08F 257/02; C08F 271/02
[52] U.S. Cl. ............................ 260/877; 260/878 R; 260/886
[58] Field of Search .................... 260/878 R, 877, 886

[56] References Cited

U.S. PATENT DOCUMENTS 3,634,548  1/1972  Harwell et al. ..................... 260/877

*Primary Examiner*—Alan Holler
*Attorney, Agent, or Firm*—Richard E. Nanfeldt

[57] ABSTRACT

Graft polymers are prepared by contacting an anionically polymerizable monomer such as butadiene with a polymer-Li.tertiary chelating polyamine complex such as polystyrene-Li.tetramethyl ethanediamine.

11 Claims, No Drawings

PROCESS FOR POLYMER LITHIATION IN GRAFT POLYMERIZATION

CROSS-REFERENCE OF RELATED APPLICATIONS

This application is a continuation, division, of application Serial No. 713,659, filed 8/12/76, which is a division of Serial No. 562,826, filed March 28, 1975, which is a continuation of Ser. No. 309,359 filed Nov. 24, 1972 (and now abandoned) which is a continuation-in-part of Ser. No. 81,181 filed Oct. 15, 1970 and entitled "Graft Polymerization" (now U.S. Pat. No. 3,751,384), which in turn is a continuation-in-part of copending application Ser. No. 825,384, filed May 16, 1969 (now U.S. Pat. No. 3,536,679), which in turn is a continuation-in-part of Ser. No. 589,240, filed Oct. 25, 1966 (now U.S. Pat. No. 3,451,988), which in turn is a continuation-in-part of application Ser. No. 266,188 filed Mar. 19, 1963 (and now abandoned). Application Serial No. 562,826 is also a continuation-in-part of copending application Ser. No. 690,054 filed Dec. 13, 1967 which in turn is a continuation-in-part of Ser. No. 560,110 filed June 24, 1966 (and now abandoned), which is a continuation-in-part of Ser. No. 505,976 filed Nov. 1, 1965 (and now abandoned) which is a continuation-in-part of Ser. No. 359,434 filed Apr. 3, 1964 (now U.S. Pat. No. 3,458,856) which is also a continuation-in-part of Ser. No. 266,188. Application Ser. No 562,826 is also a continuation-in-part of copending applications Ser. No. 886,008 and Ser. No. 886,009, each filed Dec. 17, 1969 as divisional applications of Ser. No 690,054.

Application Serial No. 562,826 is also a continuation-in-part of copending application Ser. No. 690,076 filed Dec. 13, 1967, which in turn is a continuation-in-part of Ser. No. 560,110. Application Serial No. 562,826 is also a continuation-in-part of copending application Ser. No. 61,813 filed Aug. 6, 1970 entitled "Lithiated-Amine Polymerization Catalyst", which is a continuation-in-part of Ser. No. 825,384.

Application Serial No. 562,826 is also a continuation-in-part of Ser. No. 60,772 filed Aug. 3, 1970 entitled "Method of Preparing Organo-Lithium Amine Complexes".

THE INVENTION

This invention relates to a method for preparing graft polymers. More particularly, this invention relates to the preparation of such graft polymers by contacting an anionically polmerizable monomer (e.g. styrene, acrylonitrile, butadiene, ethylene, etc.) with a polymer-Li.tertiary chelating polyamine complex such as complexes of polystyrene or polybutadiene in which a Li.tetramethyl ethanediamine is attached to the carbon atoms of the polystyrene or polybutadiene bearing aromatic (and benzylic) or allylic hydrogen atoms, respectively.

The polymer complexes which are used as the starting materials for the purposes of this invention may be made by two methods: the first method described herein as the "in situ" method involves the polymerization of a suitable monomer such as styrene with a catalyst system consisting of an organolithium such as n-butyllithium and a tertiary chelating polyamine such as tetramethyl ethanediamine. In this first method, the reaction product from the polymerization reaction is not recovered, but the catalyst residues are allowed to remain on the polymer and this material is thus the complex which may be used for the subsequent grafting of an anionically polymerizable monomer. In the second method, a pre-formed polymer, such as polystyrene, is admixed with the same catalyst system as used in the "in situ" method and the resultant material is then utilized as the polymer complex.

This invention may be better understood with reference to the following equations:

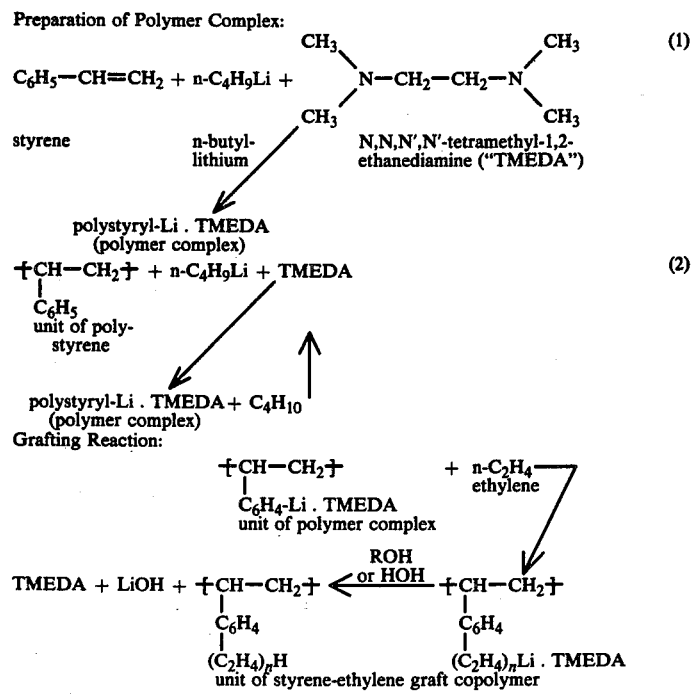

The catalyst to be used for the purposes of this invention (regardless of whether the polymer complex is formed by the "in situ" method or by metalation of a pre-formed polymer) comprises two components: an organolithium containing from 1 to 15 carbon atoms, preferably from 1 to 8 carbon atoms, and a tertiary chelating polyamine which may be monomeric or polymeric in nature and wherein the monomeric units contain about 3 to about 50 carbon atoms.

With respect to the organolithium component of the catalyst, alkyl, cycloalkyl, aryl, or aralkyl lithium compounds are all suitable so long as the parent hydrocarbon of the organolithium is less acidic (i.e. has a higher pKa) than the unit of the polymer to be metalated. The secondary and tertiary alkyl lithiums are the most reactive compounds and in general, the alkyl lithiums are preferred. Suitable examples of organolithium compounds which may be utilized as the first component of the catalyst include methyllithium, n-butyllithium, cyclooctyllithium, dodecyllithium, 2-methyl butyllithium, phenyllithium, benzyllithium, sec.-butyllithium, allyllithium, vinyllithium, etc.

As mentioned above, the second component of the catalyst is a tertiary chelating polyamine, i.e. an amine containing at least two nitrogen atoms which is capable of chelating with the organolithium component of the catalyst. Although monomeric diamines and triamines are preferred, the polyamine may contain four or more nitrogen atoms and indeed may be polymeric rather than monomeric in nature. The polyamines which have been found to be suitable are those whose monomeric units come within the scope of the general formulas:

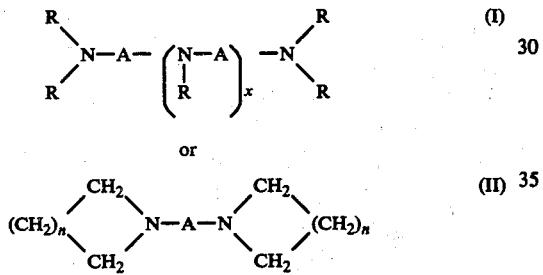

wherein the R radicals are the same or different $C_1$-$C_4$ alkyl radicals, preferably at least one R being a methyl radical; $x$ is an integer of 0 to 10,000 inclusive, preferably 0 to 5; $n$ is an integer of 0 to 3 inclusive and A is a nonreactive radical.

For the purposes of this invention, A in the above formulae is selected from the group consisting of: (1) cycloaliphatic and aromatic radicals and their lower alkyl, e.g. $C_1$ to $C_4$, derivatives having ring structures containing 4 to 7 members, wherein said radicals are attached to the nitrogen atoms at 1,2 or 1,3 positions on the rings; suitable examples including N,N,N',N'-tetramethyl-cis-1,2-cyclopentanediamine, N,N,N',N'-tetramethyl-1,2-cyclohexanediamine, N,N,N',N'-tetramethyl-o-phenylenediamine, 4-ethyl-N,N,N',N'-tetramethyl-o-phenylenediamine, hexamethyl-1,3,5-cyclohexanetriamine, N,N',N''-trimethyl-1,3,5-triazine, and the like; and (2) 1 to 4 methylenic radicals inclusive, wherein each methylenic radical contains 0 to 2 monovalent hydrocarbon radicals of 1 to 6 carbon atoms; suitable examples include 1,2-dipiperidyl ethane, N,N'-dimethyl-N,N'-diethyl-1,2-ethanediamine, N,N,N',N'-tetramethyl-1-cyclohexyl-1,2-ethanediamine, N,N,N',N'-tetramethyl-1,2-pentanediamine, N,N,N',N'-tetramethyl-1,2-propanediamine, N,N,N',N'-tetramethyl-2,3-butanediamine, N,N,N',N'-tetramethyl-1,4-butanediamine, and the like.

Examples of higher chelating polyamines include N,N,N',N'',N''-pentamethyl diethylenetriamine, N,N,N',N'',N''',N'''-hexamethyl triethylene-tetramine, poly(N-ethyl ethylene imine), and the like.

Although the polyamines set forth hereinbelow are particularly preferred insofar as availablity and costs, care should nevertheless be taken in choosing a polyamine wherein A in the general formulae would have a smaller tendency to become metalated itself rather than to bring about metalation of the unit of the polymer so that the desired polymer-Li.polyamine complex can be formed.

Particularly preferred as the chelating tertiary polyamine is the formula shown by (I) above. Suitable examples of these preferred chelating polyamines include: N,N-dimethyl-N',N'-diethyl-1,2-ethanediamine, N,N,N',N'-tetramethyl-1,2-ethanediamine, N,N,N',N'-tetraethyl-1,2-ethanediamine, N,N,N',N'-tetramethyl-1,3-propanediamine, N,N,N',N'-tetramethyl-1,2-propanediamine, N,N,N',N'-tetramethyl-1,4-butanediamine, N,N,N',N'-tetramethyl-1,2-cyclohexane diamine, and the like. Most particularly preferred herein are N,N,N',N'-tetramethyl-1,2-ethanediamine, hereinafter referred to as TMEDA, and trans-N,N,N',N'-tetramethyl-1,2-cyclohexanediamine, hereinafter referred to as trans-TMCHDA.

In carrying out the "in situ" method of preparing the polymer complex, the two components of the catalyst may be added separately to the reactor, allowing them to become mixed in the presence of the monomer during the polymerization reaction. However, it is generally desirable to prepare the catalyst system by pre-mixing the selected organolithium (the first component) with the selected tertiary chelating polyamine. Although a catalyst system comprising one organolithium and one polyamine is preferred, mixtures of organolithiums and polyamines may also be employed. Generally, the molar ratio of the organolithium to the polyamine is about 0.1:1 to 10:1, preferably 0.8:1 to 2:1.

As a matter of convenience, it is generally preferred to mix the catalyst components in the presence of an inert organic diluent. The diluent, which can also serve as th polymerization medium, should be a liquid at the operating conditions of the polymerization reaction. This diluent should be a saturated aliphatic or saturated cycloaliphatic hydrocarbon having 2 to 20 carbon atoms such as pentane, hexane, heptane, isooctane, cyclopentane, cyclohexane, decane, hexadecane and the like. Aromatic solvents such as benzene, toluene, xylene, etc., and other unsaturated solvents such as olefins or cyclohexene may be used whenever chain transfer with solvent is not a problem.

Although the concentrations of the catalyst components in the diluent are not critical, sufficient amounts of the diluent are preferably employed such that the concentration of the total amount of the catalyst components is normally in the range of 0.1 to 50 g./l., preferably 0.5 to 20 g./l. of the diluent. As a matter of convenience, the individual catalyst components may be diluted prior to mixing. Standard solutions of each catalyst component may be employed wherein the concentration of each solution is in the range of 0.1 to 5 Normal, preferably 1 to 4 Normal.

Although the temperatures required for the catalyst preparation are not critical in the ranges of −50° to +100° C., it is desirable to prepare the catalyst at temperatures ranging from 0 to 100° C., most preferably at temperatures in the range of 10 to 80° C. Since the catalyst components, after mixing, normally result in a liquid mixture, the catalyst can conveniently be prepared at atmospheric pressure.

The catalyst described above is preferably contacted as a mixture (although separate catalyst components may also be employed as set forth above), with the monomer to be polymerized. Suitable non-limiting examples of monomers which can be polymerized with this catalyst system so as to form the polymer-Li.polyamine complex include: (a) $C_4$-$C_{12}$ conjugated diolefins such as butadiene-1,3,isoprene, 2-alkyl-1,3-butadiene, 2,3-dialkyl-1,3-butadiene, piperylene, hexadiene-1,3, hexadiene-2,4, cyclohexadiene-1,3, 1-phenyl butadiene-1,3, 2-phenyl butadiene-1,3, and the like; (b) aromatic vinylic hydrocarbons such as styrene, α-methyl styrene, p-methyl styrene, etc., (c) alkylene oxides such as alkylene oxide, propylene oxide, butadiene monoxide, etc.; (d) alkyl acrylates and methacrylates such as methyl methacrylate, ethyl acrylate, butyl acrylate, etc. Other useful monomers include acrylonitrile, dialkyl acrylamides, vinyl heterocyclics, acetaldehyde, ethylene, acrylamides, etc.

It should be understood that the Li.polyamine moiety of the polymer complex need not necessarily be attached to units of a homopolymer and consequently, in preparing the complex, mixtures of two or more monomers may be polymerized with the catalyst system. Thus, mixtures of monomers may be used such as butadiene-styrene, butadiene-ethylene, and styrene-ethylene.

As mentioned above, in the first step of this process, the catalyst (either as individual components or as a mixture) is placed in the reactor and the monomer or mixture of monomers to be polymerized is admitted thereinto. Although the monomers may be polymerized in the absence of diluent, if no diluent has been employed in the catalyst preparation, it is desirable to add sufficient amounts of a diluent of the type set forth hereinabove as being useful for preparation of the catalyst prior to introduction of the monomers. High monomer concentrations are preferred and when a diluent is used in the polymerization reaction, the minimum monomer concentration in the diluent should be about 1 wt. %, preferably 10 wt. %, based on the weight of the diluent. The polymerization reaction is then carried out at a temperature of about −100 to 100° C., generally 0 to 80° C. The monomers are allowed to remain in contact with the catalyst system for about 0.1 to 10 hours, preferably 0.5 to 4 hours. The polymerization reaction may be carried out at pressures ranging from atmospheric to as high as 6000 psig or higher if necessary.

The amount of monomers added to the reactor will, of course, be determined by the age of the catalyst, reaction time, diluent volume, desired monomer conversion, etc., but may advantageously be in the range of about 50 g. to about 5000 g. monomer per g. total catalyst when the reaction is carried out batchwise. Normally, it is desirable for good operability to limit the concentration of the polymer in the diluent to less than 25 wt. %. If necessary, the polymer concentration may be maintained at or below this level by the addition of more diluent during the polymerization reaction.

In preparing and using the catalyst of the type mentioned hereinabove, all steps should be carried out in the absence of moisture and preferably also in the absence of oxygen or other harmful impurities. This may be readily done by blanketing the materials with an inert gas, such as dry nitrogen or argon. The raw materials, i.e. both the reactants and inert diluents, may be preferably purified or otherwise treated so as to remove traces of moisture, oxygen, carbon dioxide and other catalyst poisons.

At the end of the reaction, the polymer complex formed is not recovered from the reaction medium, but rather the entire reaction product is utilized for the subsequent grafting of an anionically polymerizable monomer as will be discussed hereinbelow.

In the second method for preparing the polymer complex, the pre-formed polymer (obtained by any method) is converted to the corresponding polymer complex by metalation of the base polymer with the same catalyst system as that described hereinabove with respect to the "in situ" method for preparing polymer complexes. In the second method for preparing the complex, the organolithium compound, tertiary chelating polyamine (added as separate components or as a pre-mixture) and polymer are merely admixed in the liquid phase at temperatures of about −100° C. to about +150° C., preferably −50° to +100° C.; the reaction time is generally short and the complete reaction usually occurs within about 1 minute to about 4 hours, although up to several days may be required in some cases when the metalation driving force is small.

If desired, metalation of the pre-formed polymer may be effected in a hydrocarbon diluent which is not reactive with the components and diluents such as those described hereinabove for the preparation of the catalyst system are suitable. The proportion of catalyst system to the base polymer is not critical. However, the degree of metalation of the polymer will necessarily depend on the proportion of the catalyst to the polymer and the number of sites in the polymer that are available for metalation. Thus, if the polymer contains a large number of metalatable sites, and it is desired that there be a large number of complexed sites available for the subsequent grafting reaction, it is only necessary that a sufficient proportion of the catalyst system be used to metalate all of such sites. Indeed, in the case of the "in situ" polymer, although the subsequent grafting reaction will occur with the amount of catalyst present in the form of the polymer-Li.polyamine complex, it may be desirable to add additional amounts of catalyst in order to introduce additional metalation sites for the subsequent grafting reaction.

Regardless of the method employed to obtain the polymer-Li.polyamine complex, it is desirable that the base polymer moiety of the complex be one which has a pKa of about 40 or less on the MSAD pKa scale. Some organic materials having such a pKa are shown on page 19, Table XIV of "Fundamentals of Carbanion Chemistry", D. J. Cram, Academic Press, New York, 1965. Particularly preferred are those base polymers having pKa between about 15 and 40. The use of base polymers having the requisite pKa will insure that the polymers rather than the polyamines employed in the catalyst system will become metalated and will further enhance the selection of the possible monomers which can be grafted onto the polymer complex, i.e. by use of base polymers having the requisite pKa, polymer complexes will be obtained in which the complex moiety will be readily displaced by the monomer which is to be grafted onto the base polymer.

In general, it has been found that the base polymer should be one which contains units selected from the group consisting of (a) hydrocarbon radicals containing carbon atoms bearing aromatic, benzylic or allylic hydrogen atoms; (b) cyclopropyl radicals; and (c) at least one methyl or methylene radical attached to a nitrogen, silicon, sulfur, phosphorus, or oxygen atom. The base polymer need not of course be a homopolymer, but may contain two, three or four, or more diverse monomers.

Suitable non-limiting examples of the base polymers which can be metalated so as to form useful polymer complexes are (a) homopolymers and copolymers of diolefins such as polybutadiene, polyisoprene, polypiperylene, trans-1,4-polyisoprene, isoprene-isobutylene copolymers, butadiene-styrene copolymers, piperylene-isobutylene copolymers, ethylene-butadiene, polycyclopentadiene; vinylic polymers such as polystyrene, poly-α-methyl styrene, styrene-isobutylene copolymers, styrene-ethylene, poly(N-vinylcarbazole); ethylene-propylene terpolymers (EPDMs) such as ethylene-propylene-hexadiene, ethylene-propylene-dicyclopentadiene, ethylene-propylene-methylene norbornene, ethylene-propylene-ethylidene norbornene, and the like; polyphenylene oxide, polyxylyene, polytetrahydrofuran; (b) polyvinylcyclopropane and related polymers and copolymers containing pendant cyclopropyl groups; (c) poly-(N-alkyl)-ethylene imines such as poly-(N-methyl)-ethylene imine and poly-( N-butyl)-ethylene imine, polyvinyl trimethylsilane, polypropylene sulfide, polyvinyl methyl sulfide, polyethylene sulfide, polyallyl dimethyl phosphine, polyethylene oxide, polyvinyl methyl ether; (d) polyacenaphthylene, polyindene, etc.

The grafting reaction is carried out by merely contacting the polymer complex prepared by either method as described above with an anionically polymerizable monomer. When the polymer complex is prepared "in situ" and no additional catalyst is added, one obtains predominantly end grafts; when additional catalyst is added to the "in situ" complex, one obtains both end and side grafts; and when catalyst is added to preformed polymer, one obtains predominantly side grafts. Suitable examples of anionically polymerizable monomers include all those previously listed as being polymerizable with the catalyst system of the instant invention to form the polymer-Li.polyamine complex.

The polymer complex in which the base polymer may have a viscosity average molecular weight varying from 500 to 5,000,000, with or without an inert diluent, may be admitted into the reactor containing the anionically polymerizable monomer (in the presence or absence of an inert diluent of the type described hereinabove), or the reverse order may be employed. Generally, it is convenient to add the polymer complex to a monomer which is normally liquid at room temperature and pressure and utilize the reverse order of addition when the monomer is normally gaseous at room temperatures and pressures.

The grafting reaction may be carried out conveniently at room temperature and pressure, although temperatures of −100° to +150° C., preferably 0° to 100° C. and pressures of atmospheric to as high as 5,000 psig or higher (particularly in the case of gaseous monomers) may be employed.

It should be understood that the novel grafting process described herein permits the grafting of a single anionically polymerizable monomer or a mixture of anionically polymerizable monomers. Moreover, depending on the displacement strength of the anionically polymerizable monomer, graft polymers can be prepared in which the monomers are either a mixture of monomers or one monomer may be grafted onto the polymer complex and thereafter a different monomer may be propagated onto the monomer just introduced or trans-metalation may occur and the second monomer may be introduced onto another metalatable site of the base polymer. In addition, it should also be understood that the same monomer as exists in the chain of the base polymer of the polymer complex may also be grafted onto the polymer complex.

The anionically polymerizable monomer of choice is allowed to remain in contact with the polymer complex for about 0.1 to about 10 hours, preferably 0.5 to 4 hours. At the end of this time, the grafting reaction is terminated and the graft polymer is recovered from the reaction mixture by adding water, alcohols such as methyl alcohol, isopropyl alcohol, n-butyl alcohol and the like, ketones such as acetone or methyl ethyl ketone, hydrocarbons or other nonsolvents for the polymer. The precipitated graft polymer is then filtered and washed with more alcohol or other suitable solvents and may then be finished by the addition of suitable stabilizers, followed by drying.

The polymer complexes prepared as described hereinabove also offer the advantage that in addition to their ability to undergo grafting reactions with anionically polymerizable monomers, the polymer complexes are also capable of reaction with those compounds known in the prior art as being capable of reacting with organolithium compounds or in Grignard reactions. Useful nonpolymeric functionalities may be added to the polymer in this manner. For example, the polymer complexes described hereinabove may be reacted with oxygen, sulfur, carbon monoxide, carbon dioxide, carbon oxysulfide, carbon disulfide, sulfur dioxide, sulfur trioxide, the various oxides of nitrogen, the halides of the various oxides, cyanates, isocyanates, thiocyanates, isothiocyanates, aldehydes, ketones, ketenes, anhydrides, esters, oxiranes, oxethanes, episulfides, alkylene sulfides, N-substituted ethylene imines, N,N-disubstituted amides, organosilanes, etc. Of course, these functionalities may themseleves be present in polymer chains. Thus, reaction with the polymer complexes of the instant invention would produce new graft copolymers directly.

This invention may be more fully understood by reference to the following examples.

EXAMPLE 1

Block Copolymerization of Ethylene with Butadiene and Styrene

A catalyst was prepared which was composed of 0.004 mole butyllithium and 0.004 mole N,N,N′,N′-tetramethyl-12,-ethane-diamine (TMEDA). This catalyst was dispersed in 25 ml. n-heptane. In one experiment 14 g. butadiene in 500 ml. n-heptane was contacted with the catalyst for 24 hours at 25° C. to obtain polybutadienyl-lithium.TMEDA. In a second experiment, 5 ml. styrene in 700 ml. n-heptane was contacted with the catalyst for ca. ¼ hour at 25°–40° C. to obtain polystyryl-lithium·TMEDA. Ethylene was then added to these "living" polymers in a 2 l. autoclave for 3–4 hours at 40° C. and 2000 psig ethylene pressure. The results are shown in the following table:

TABLE I

| Ethylene Copolymer | % Polymer Yield Based on Styrene or Butadiene | I.V. in Decalin at 135° C., dl/g. | % Ethylene in Copolymer by Quantitative I.R. |
|---|---|---|---|
| Styrene | 49 | 0.28 | 56 |
| Butadiene | 60 | 0.10 | 10 |

Fractionation studies were the undertaken to determine whether these copolymers are true copolymers or merely mixtures of homopolymers. These fractionation studies were accomplished with the use of carbon disulfide. The $CS_2$ soluble portion (17.5% total) showed no evidence of polyethylene in the 13.7μ and 13.9μ I.R. bands. Additionally, the existence of low molecular weight polystyrene was not shown by the I.R. analysis indicating that very little styrene homopolymer (which is soluble in $CS_2$) was produced in the reaction. The $CS_2$ insoluble portion (82.5% of the total) showed strong polyethylene bands and evidence for polystyrene, e.g. in the 9.7μ and 6.2μ bands. Thus, it is concluded that this product is substantially a block copolymer of styrene and ethylene.

The butadiene-ethylene polymers were also extracted with $CS_2$ to remove any homopolybutadiene. The insoluble portion (about 100%) showed strong polybutadiene I.R. bands proving that copolymerization had been achieved.

EXAMPLE 2

Copolymerization of Mixtures of Ethylene and Styrene of Butadiene

The procedure of Example 1 was repeated except that the catalyst was added to the mixture of monomers at 2000 psig. In this example, 12 g. of styrene or butadiene was used. Results are shown in Table II.

TABLE II

| Ethylene Comonomer | % Polymer Yield Based on Styrene or Butadiene | I.V. in Decalin at 135° C., dl/g. | % Ethylene in Copolymer |
|---|---|---|---|
| Styrene | 50 | 0.16 | 9 |
| Butadiene | 135 | 0.22 | 60 |

In a similar set of experiments, 80 g. butadiene or 58 g. styrene, 700–900 psig ethylene and 8 mmoles catalyst were used. The catalyst was added in increments during the run. The data are summarized in Table III.

TABLE III

| Ethylene Comonomer | % Polymer Yield Based on Styrene or Butadiene | I.V. in Decalin at 135° C., dl/g. | % Ethylene in Copolymer Based on I.R. | Yield |
|---|---|---|---|---|
| Styrene | 87 | 0.25 | Present | — |
| Butadiene | 121 | 0.53 | 3.2 | >17 |

The ethylene-butadiene copolymer was fractionated by extraction with carbon disulfide. Both the soluble and insoluble fractions showed 3–4% ethylene based on infrared absorption at 13.9μ. Since the 13.9μ absorption only measures methylene sequences of six or longer and since the yield indicates a much larger amount of ethylene is present, the major proportion of the ethylene must have been present as isolated units.

EXAMPLE 3

A lithiated polymeric amine was prepared by reacting 1 mmole of n-butyllithium with 2.2 mmoles (based on the monomeric units) of poly-(N-n-butyl-ethyleneimine) (681 number average molecular weight) in 10 ml. n-heptane for 30 minutes at ambient temperature. A solution of 5.71 g. butadiene in 46 ml. n-heptane was added and polymerization was allowed to proceed over a two hour period at room temperature. The polymeric lithiated amine dissolved as the butadiene polymerization reaction proceeded. The catalyst residues were extracted from the reaction solution by extraction with aqueous HCl and with water. After drying the solution over potassium carbonate, it was vacuum dried, yielding 4.98 g. of polybutadiene containing 0.52 wt. % nitrogen from initiation by the lithiated polymeric amine. The polybutadiene microstructure was found to be (by infrared analysis) 59.6% vinyl unsaturation, 22.6% trans-unsaturation and 17.7% cisunsaturation.

EXAMPLE 4

A hexane solution (125 g.) containing 20g. of butyl rubber (1.9 mole % unsaturation) was diluted with 200 ml. n-heptane and 6 mmoles each of BuLi and TMEDA were added. A pale yellow color formed quickly and darkened upon standing 4 days at room temperature. An additional 6 mmoles TMEDA was added and the solution was heated to 50–60° C. for 1 hour to destroy any excess BuLi.

Styrene (10g. freshly distilled) was added and polymerization proceeded 3 hrs. at ambient temperature to obtain the graft copolymer. Catalyst was killed by addition of 1 ml. methanol and the polymer was precipitated by addition of an equal volume of acetone, washed with acetone and vacuum dried. This procedure was found to remove low mol. wt. polystyrene homopolymer. The graft copolymer yield was 21.8g.

EXAMPLE 5

The procedure of Example 4 was followed except that butadiene was grafted onto butyl by adding gaseous butadiene to the solution of polylithiated butyl rubber. Polymerization temperature rose to 50° C. after which the mixture was allowed to polymerize overnight at room temperature. The graft copolymer was worked up using the same procedure as Example 4 since this was known to remove polybutadiene homopolymer. The yield was 23.1g.

EXAMPLE 6

Ethylene-propylene-ethylidenenorbornene terpolymer rubber (5g) (3 mole % unsaturation) was dissolved in 100 ml n-heptane and 2 mmoles each of BuLi and TMEDA were added. Yellow color was obtained as metalation of the allylic hydrogens occurred. After 4 days at room temperature, 2 mmoles TMEDA were added and solution was heated to 50°–60° C. to kill excess BuLi.

Freshly distilled styrene (from $CaH_2$) was added and polmerized 3 hours. The product was isolated as in Example 4. The yield of graft copolymer was 5.23g.

EXAMPLE 7

The procedure of Example 6 was followed except that butadiene was grafted onto the polylithiated ethylene propylene terpolymer. Gaseous butadiene was added starting at 45° C. and polymerization temperature was maintained at 40–60° C. for 2 hours. The yield of graft copolymer was 5.34g.

EXAMPLE 8

A solution of 16.9g. cis-polybutadiene in 400 ml. n-heptane was metalated by addition of 6 mmoles of BuLi·TMEDA complex. An immediate dark orange-brown color was obtained.

Addition of styrene produces a graft copolymer having thermolastic properties. Addition of butadiene produces a graft copolymer having high vinyl unsaturation in the grafts.

EXAMPLE 9

To a solution of 5g. poly($\alpha$-methylstyrene) in 100 ml. cyclohexane at 60° C. is added 3 mmoles BuLi·TM-1,2-PDA (freshly prepared in 10 ml. cyclohexane). Metalation is complete after 1 hour.

Addition of 5g. styrene at 60° C. produces the desired graft copolymer.

EXAMPLE 10

Poly(2,6-xylenol) (5g.) dissolved in 100 ml. benzene is metalated using 6 mmoles BuLi·TMPDA at room temperature yielding a yellow slurry. Addition of 5g. isoprene followed by polymerization for 24 hours at 25° C. yields a graft copolymer in which 3,4-polyisoprene microstructure predominates.

EXAMPLE 11

A solution of 5g. poly(dimethylsiloxane) in 100 ml. cyclohexane is metalated at 25° C. by adding 5 mmoles sec-BuLi and then 5 mmoles TMEDA. Polymerization of 3g. styrene at 25° C. with the lithiated poly(dimethylsiloxane) produces a graft copolymer having excellent thermolastic properties.

EXAMPLE 12

A 5% solution of butyl rubber in hexane is metalated with sec-BuLi·TMEDA at 50° C for 1 hour and a 3:1 molar mixture of butadiene and styrene is added. Copolymerization occurs at 50° C. for 3 hours. The graft copolymer is isolated as described in Example 4.

EXAMPLE 13

In a similar experiment to Example 13, poly-(N-methyl)-styrene imine was reacted with BuLi for one-half hour during which time metalation occurred as shown by the color change from yellow to orange-red. When butadiene was added, an orange colored phase separated which re-dissolved after 1½ hours polymerization time. The reaction was terminated after 2 hours and the flocculent white precipitate was isolated by filtration. The unsaturation in the product was 50.6% vinyl, 25.2% trans and 24.2% cis.

EXAMPLE 14

Metalation of polymers takes place in an identical manner to the metalation of small molecules; i.e., the most acidic positions will be metalated most rapidly. Therefore, polymers containing aromatic, benzylic, allylic, N—$CH_3$, etc., groups are metalated to produce the corresponding polymer-Li.chelate structures. However, with polymers it is possible to obtain polymetalated molecules, whereas most small molecules are metalated more than once only with great difficulty. For example, polystyrene contains benzylic and aromatic hydrogens and undergoes metalation similar to cumene; polyisoprene contains allylic hydrogens and metalates similar to 3-methylhexene-3; styrene-butadiene rubber (SBR) contains benzylic, aromatic and allylic hydrogens and can be metalated readily; poly-(N-methyl ethylenimine) can be metalated at the N—$H_3$ groups similar to trimethylamine.

The metalation of polymers can be illustrated using butyl rubber, a copolymer of isobutylene and isoprene, which contains sufficiently acidic allylic hydrogens. The butyl rubber had a viscosity average molecular weight of 557,000 and 1.9 mole % unsaturation. A solution of 20 g. butyl rubber in 200 ml. dry, degassed n-hexane was prepared. The BuLi·TMEDA complex (8.9 mmoles) was prepared in 25 ml. n-hexane and, after 30 minutes at 25° C., it was added to the butyl rubber solution. Metalation was allowed to proceed for one week at room temperature. The metalated polymer was carbonated by bubbling dry, oxygen-free carbon dioxide through the solution. As carbonation took place, the polymer solution increased in viscosity and finally gelled. The $CO_2$-saturated solution was allowed to stand 3 days. The solution was washed with 10% aqueous HCl, and the polymer was precipitated with acetone and vacuum dried, yielding 20 g. product. The product was purified by dissolving in hexane, extracting 5 times with aqueous HCl, water-washing until the washings were neutral, precipitating with acetone, and vacuum drying. A 95% recovery of carboxylated polymer was obtained, which analyzed 2.3% oxygen by neutron activation.

It is to be understood that this invention is not limited to the specific examples which have been offered merely as illustrations and that modifications may be made without departing from the spirit and scope of the invention.

What is claimed is:

1. A process for preparing graft polymers which comprises contacting an anionically polymerizable monomer with an aromatic polymer-Li.tertiary chelating polyamine complex in which the Li.tertiary chelating polyamine moiety of the complex is attached to carbon atoms of units within the polymer, said aromatic polymer being selected from the group consisting of poly-(N-methyl)-styrene imine, or styrene-ethylene copolymer, and said anionically polymerizable monomer being ethylene, said ethylene being grafted onto aromatic sites of said aromatic polymer.

2. The process of claim 1 wherein the polyamine is a diamine or a triamine.

3. The process of claim 2 wherein the polyamine contains at least one unit having the open chain or cyclic formula:

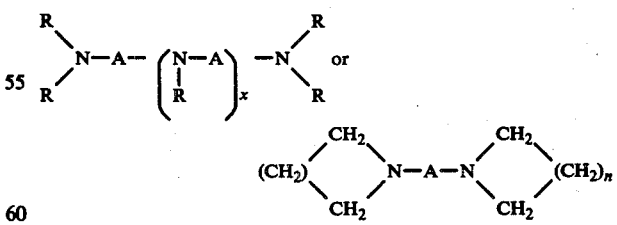

wherein the R radicals are the same or different alkyl radicals containing 1 to 4 carbon atoms inclusive, n is an integer of 0 to 3 inclusive, x is an integer of 0 to 10,000 inclusive, and A is a nonreactive radical selected from the group consisting of: (1) cycloaliphatic and aromatic radicals and their lower alkyl derivatives having ring structures containing 4 to 7 members, wherein said radicals are attached to the nitrogen atoms at 1,2 and 1,3 positions on the rings; and (2) 1 to 4 methylenic radicals inclusive, wherein each methylenic radical contains 0 to 2 monovalent hydrocarbon radicals of 1 to 6 carbon atoms.

4. The process of claim 3 wherein A in the general formulas is a $C_5$-$C_6$ cycloalkylene group or a $C_2$-$C_3$ alkylene group.

5. The process of claim 3 wherein the polyamine is N,N,N',N'-tetramethyl-1,2-cyclohexane diamine.

6. The process of claim 3 wherein the polyamine is N,N,N,',N'-tetramethyl-1,2-ethane diamine.

7. The polymer produced by the process according to claim 1 wherein the polyamine is a diamine or a triamine.

8. The polymer produced by the process according to claim 7 wherein the polyamine contains at least one unit having the open chain or cyclic formula:

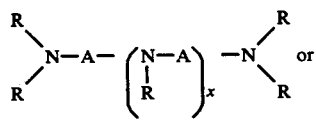

-continued

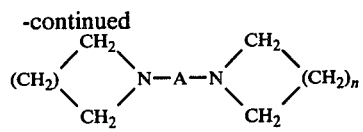

wherein the R radicals are the same or different alkyl radicals containing 1 to 4 carbon atoms inclusive, n is an integer of 0 to 3 inclusive, x is an integer of 0 to 10,000 inclusive, and Z is a nonreactive radical selected from the group consisting of: (1) cycloaliphatic and aromatic radicals and their lower alkyl derivatives having ring structures containing 4 to 7 members, wherein said radicals are attached to the nitrogen atoms at 1,2 and 1,3 positions on the rings; and (2) 1 to 4 methylenic radicals inclusive, wherein each methylenic radical contains 0 to 2 monovalent hydrocarbon radicals of 1 to 6 carbon atoms.

9. The polymer produced by the process according to claim 8 wherein A in the general formula is a $C_5$-$C_6$ cycloalkylene group or a $C_2$-$C_3$ alkylene group.

10. The polymer produced by the process according to claim 9 wherein the polyamine is N,N,N',N'-tetramethyl-1,2-ethane diamine.

11. The polymer produced by the process according to claim 9 wherein the polyamine is N,N,N',N'-tetramethyl-1,2-cyclohexane diamine.

* * * * *